United States Patent [19]

Cheng

[11] Patent Number: 5,609,249
[45] Date of Patent: Mar. 11, 1997

[54] COMPACT DISC HOLDER ASSEMBLY

[76] Inventor: Billy Cheng, 1 Fl., 31-2, San Ming Rd., Hsin Tien City, Taipei Hsien, Taiwan

[21] Appl. No.: 487,687

[22] Filed: Jun. 7, 1995

[51] Int. Cl.$^6$ .................................................. B65D 85/57
[52] U.S. Cl. ........................ 206/308.1; 206/310; 206/493
[58] Field of Search ................................... 206/309, 310, 206/308.1, 493

[56]           References Cited

U.S. PATENT DOCUMENTS

| 3,730,340 | 5/1973 | Neubert | 206/493 X |
| 4,535,888 | 8/1985 | Nusselder | 206/308.1 X |
| 4,901,856 | 2/1990 | Thiele | 206/493 X |
| 5,176,250 | 1/1993 | Cheng | 206/308.1 X |
| 5,284,248 | 2/1994 | Dunker | 206/308.1 |
| 5,322,162 | 6/1994 | Melk | 206/310 |

Primary Examiner—Bryon P. Gehman
Attorney, Agent, or Firm—Bacon & Thomas

[57]           ABSTRACT

A compact disc holder combination includes a flat carrier having a positioning through hole and a pair of clasp slots oppositely disposed therein at suitable positions, and a pair of clasp seats. At least one of the clasp seats having a pawl for holding a compact disc. Each clasp seat is provided with a plurality of posts and insert holes on a rear side thereof. The clasp seats are fitted onto opposite surfaces of the carrier at the positioning through hole in such a manner that the posts of one clasp seat fit into the insert holes of the other clasp seat while the insert holes of the one clasp seat receives the posts of the other clasp seat. Their connection may be reinforced by welding or using an adhesive agent. Both clasp seats may be provided with a pawl for keeping two compact discs on opposite surfaces of the carrier. The grip slots facilitate placement or removal of smaller size compact discs.

6 Claims, 5 Drawing Sheets

COMPACT DISC HOLDER ASSEMBLY

BACKGROUND OF THE INVENTION

The present invention relates generally to a compact disc holder combination, and more particularly to a compact disc holder combination adapted for use in compact disc storage boxes and portable compact disc cases, and to be enclosed with books and mail orders, in which a single side or both sides of a compact disc carrier have elastic pawl means for receiving one or two compact discs, and means are provided to facilitate removal or placement of smaller size compact discs.

People's continuous pursuit for upgraded life quality and their demand for better enjoyment and appreciation of music foster the popularity of compact discs. In the conventional compact disc storage boxes and portable compact disc holders, there is provided a single pawl means integrally formed with the box or holder itself. Due to the limitation posed by molding, only one side of the box or holder is provided with an elastic pawl means for receiving a compact disc. Relatively, such an arrangement is space occupying. In particular, for dual compact discs sold as a set, storage and carrying is inconvenient. Furthermore, there is a kind of smaller size compact discs on sale in the market. Although the central clasp holes in both the regular size compact discs and the smaller size compact discs are of the same size, it is relatively difficult to fit the smaller size compact discs onto the clasp means or remove them therefrom. This is because the body of the holder obstructs placement or removal with the hand, which is likely to damage or dirty the compact discs. In addition, for compact discs enclosed with books or mail orders, for the sake of compactness and cost saving, the holder is made of paper or plastics material, and the elastic pawl means are molded separately and adhered to the paper or plastics holder. Such a method is very uneconomical; besides, the elastic pawl means may not be properly centrally positioned on the paper or plastics holder.

SUMMARY OF THE INVENTION

A primary object of the present invention is to provide a compact disc holder combination in which a positioning through hole is formed in a flat carrier at a suitable position. A pair of clasp seats with at least an elastic pawl means are disposed on opposite sides of the carrier. Each of the clasp seats has a plurality of posts and a plurality of insert holes. The clasp sets are fitted together on both sides of the positioning through hole of the carrier in such a manner that the posts of one clasp seat are inserted into the insert holes of the other clasp seat while the insert holes thereof receive the posts of the other clasp seat. Their joints may be further reinforced by welding or bonding. Both clasp seats may be provided with elastic pawl means for receiving two compact discs.

Another object of the present invention is to provide a compact disc combination to eliminate the drawbacks in the prior art and which may be speedily and conveniently made.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
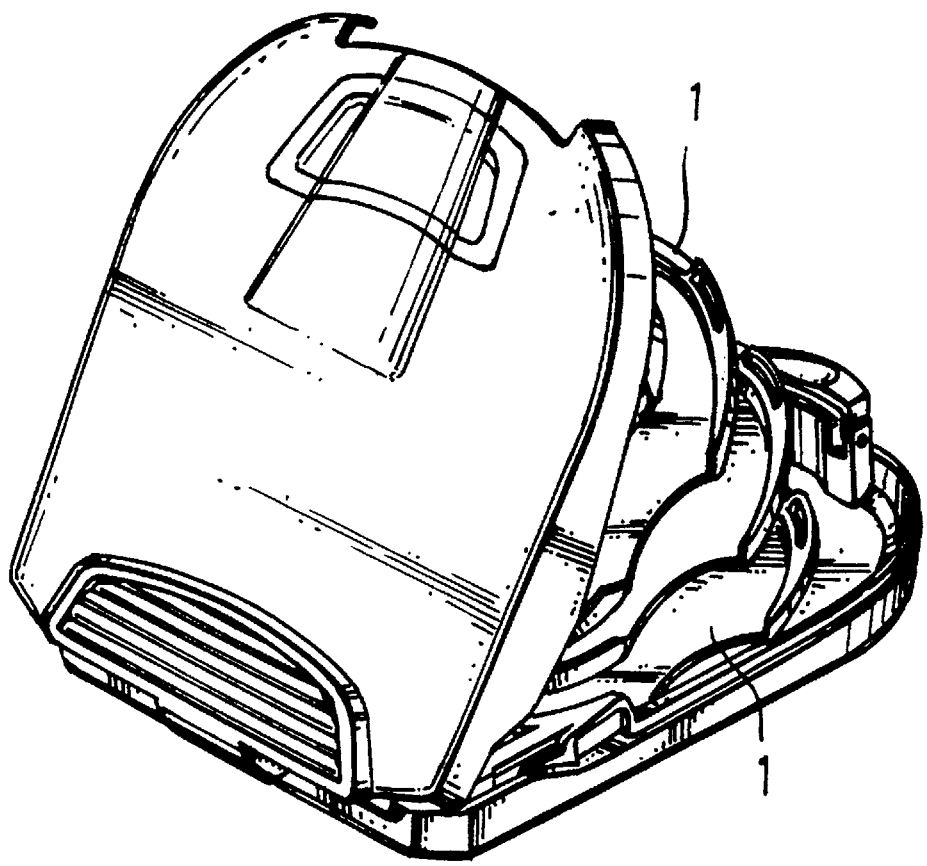
FIG. 1 is a perspective view of a preferred embodiment of the present invention.

With reference to the drawings, the compact disc holder combination according to the present invention mainly comprises a flat or planar-shaped carrier 1 and a pair of clasp seats 2. The sheet-like carrier 1 has a positioning through hole 3 and a pair of grip slots 4 oppositely disposed therein at suitable positions. Both clasp seats 2 may be configured to have an elastic pawl means 5, or one of the clasp seats 2 may be configured to be a plate 6. Each of the clasp seats 2 is provided with a plurality of posts 7 and a plurality of insert holes 8 at a rear side thereof.

Figure 2:
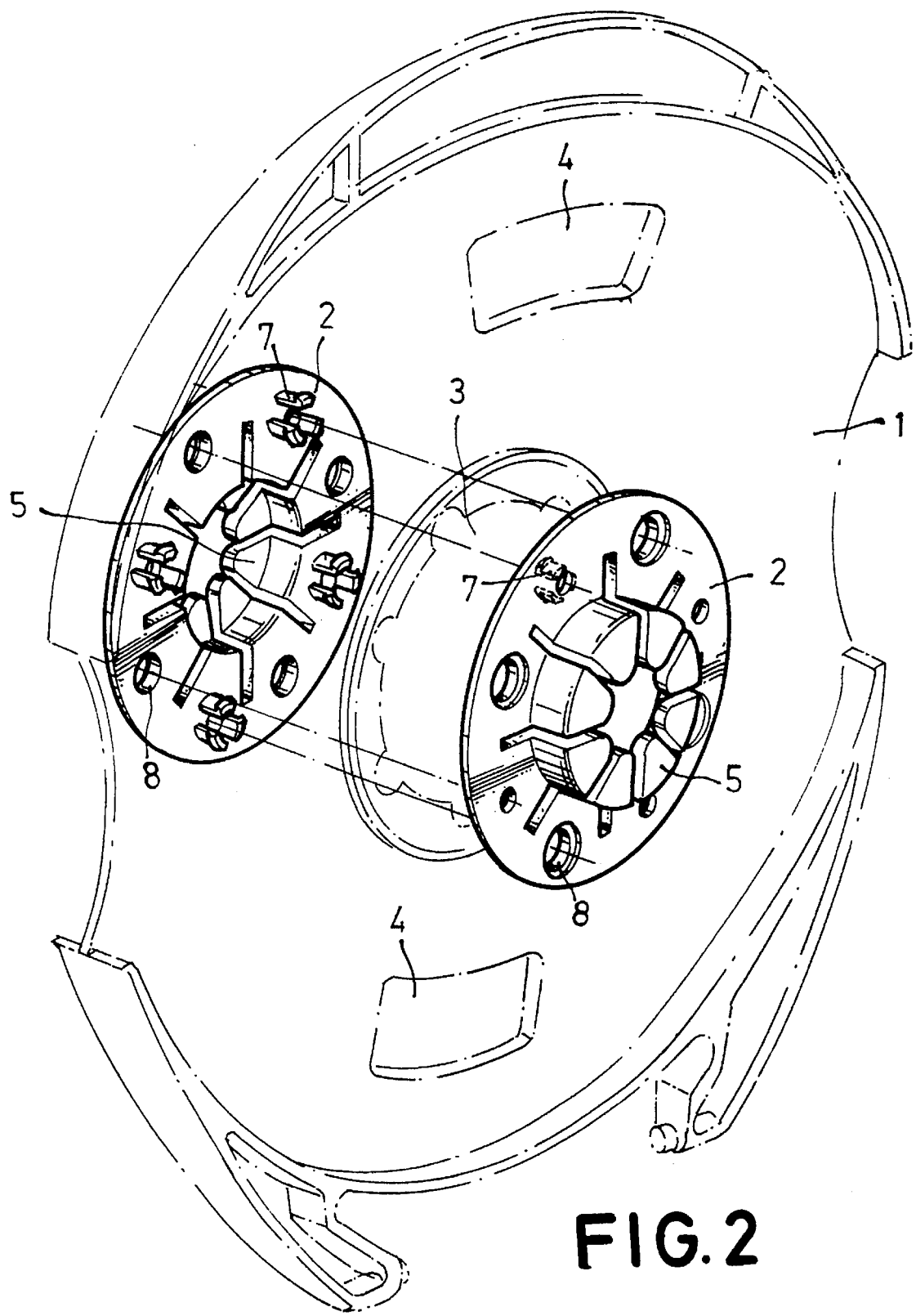
FIG. 2 is a perspective exploded view of the preferred embodiment of the present invention.
Figure 3:
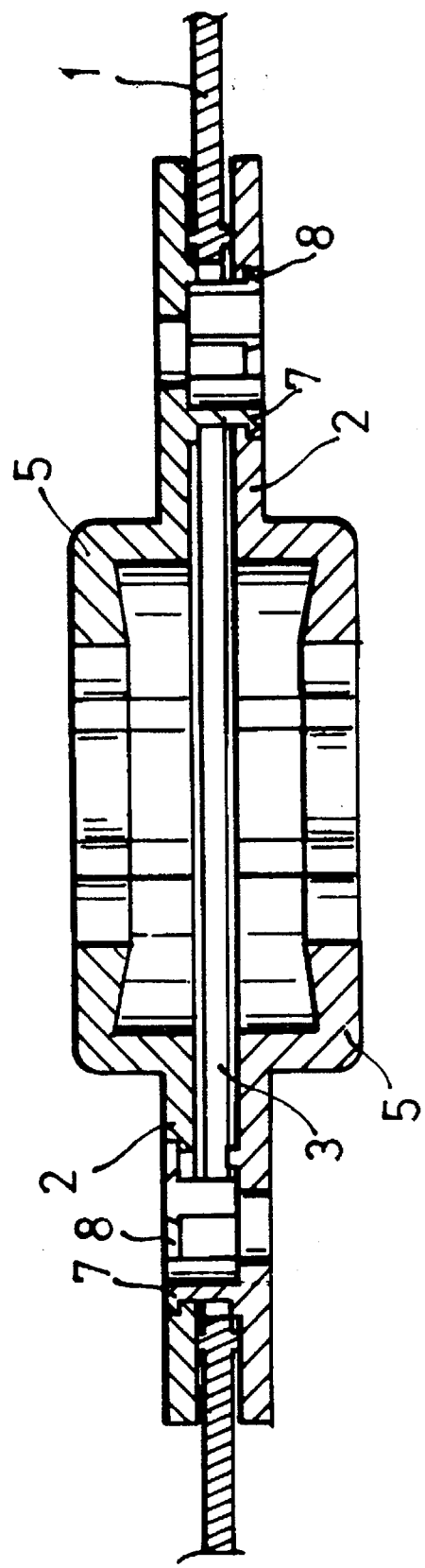
FIG. 3 is a sectional view of the preferred embodiment of the present invention.
Figure 4:
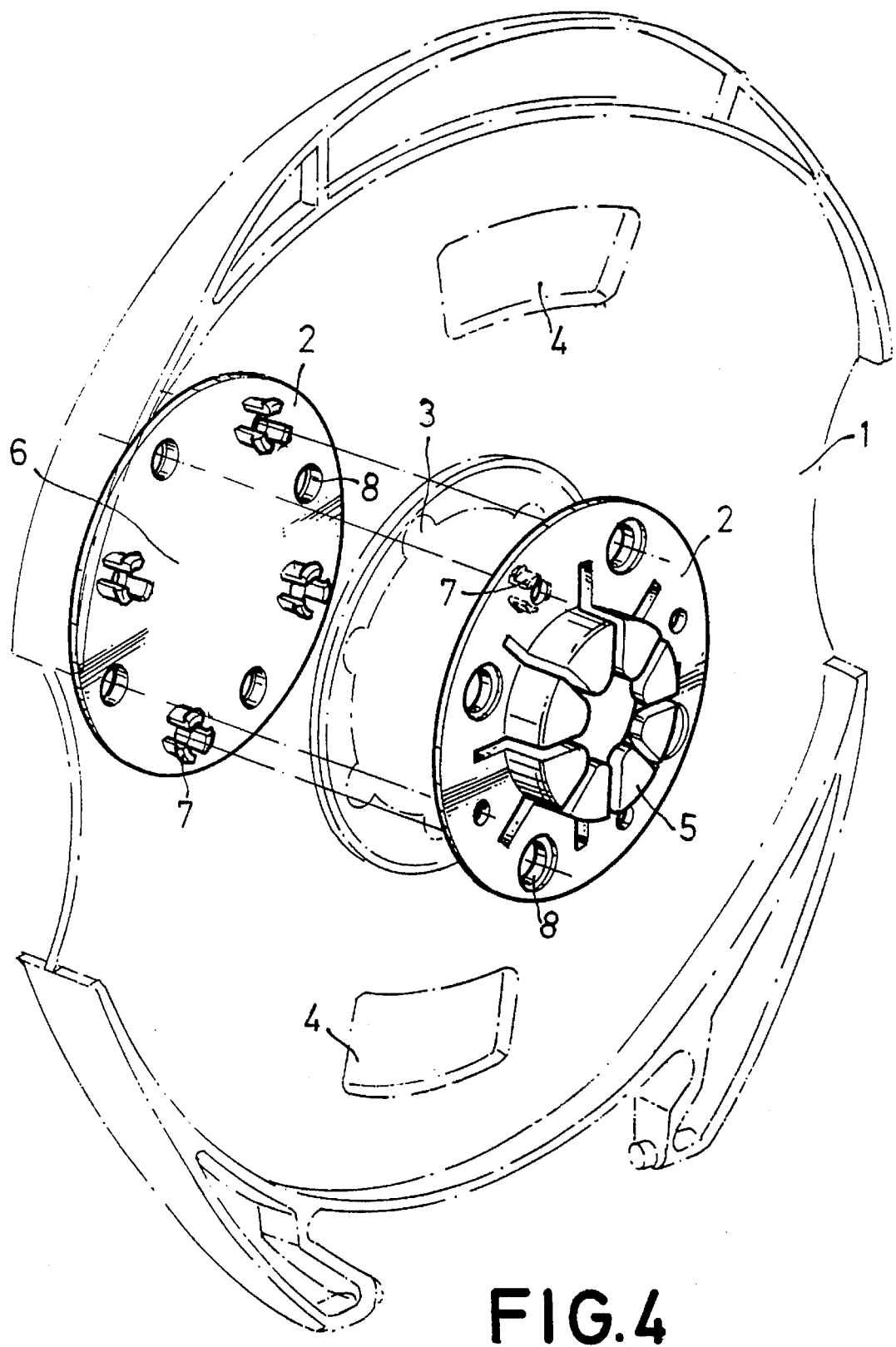
FIG. 4 is a perspective exploded view of another preferred embodiment of the present invention.
Figure 5:
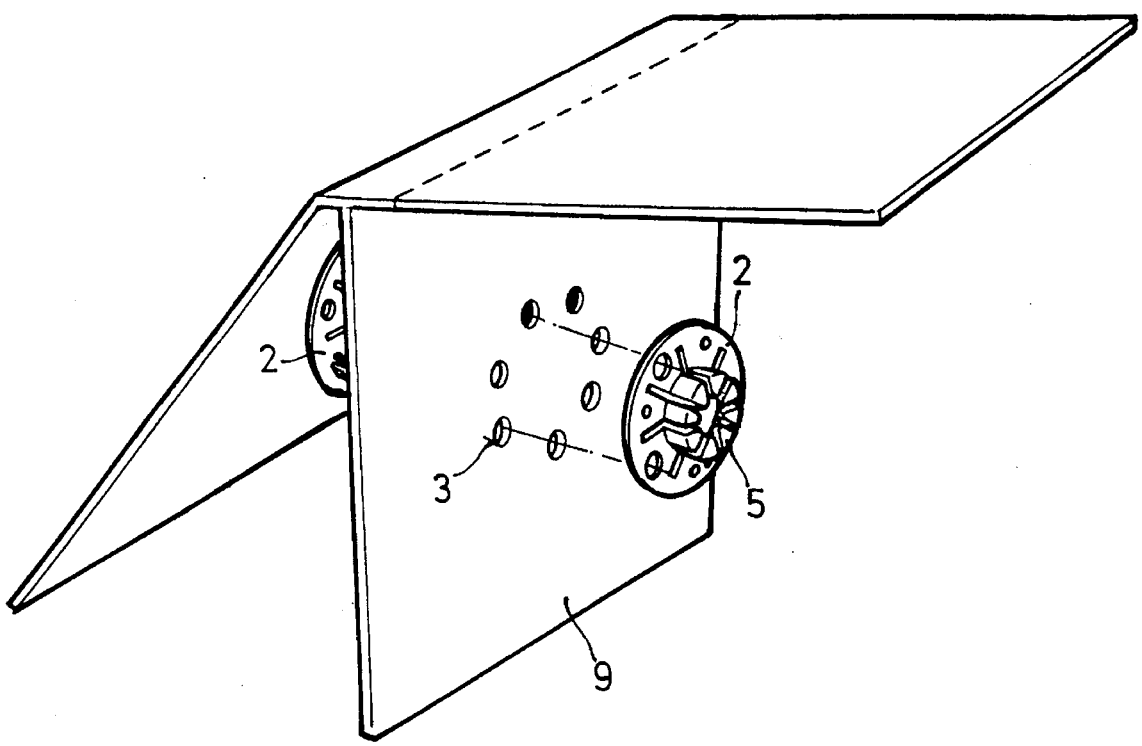
FIG. 5 is a perspective view of still another preferred embodiment of the present invention.

In actual assembly, the manufacturer may choose to employ two clasp seats 2 each an with elastic pawl means 5, or just one clasp seat with an elastic pawl means 5 in conjunction with the plate 6. As shown in FIG. 2, two clasp seats 2 with elastic pawl means 5 are fitted onto opposite sides of the positioning through hole 3 of the carrier 1 for keeping two compact discs. In FIG. 4, however, a plate 6 is used in cooperation with a clasp seat 2 with an elastic pawl means 5 for keeping a single compact disc. As for the sheet-like carrier 1, two clasp seats 2 are respectively provided on opposite surfaces of the carrier 1, with the posts 7 of one clasp seat 2 fitted into the insert holes 8 of another clasp seat 2, while its insert holes 8 receive the posts 7 of the other clasp seat 2 via the positioning through hole 3. If desired, the clasp seats 2 may be welded or adhered to the carrier 1 to reinforce the joints. After joining, the carrier 1 together with the clasp seats 2 fitted thereon are placed inside a case. Referring to FIG. 5, the present invention is adapted for use in compact disc holding plates enclosed with books or mail orders. A multiplicity of positioning holes 3 are punched in a plate made of cardboard paper or plastic material. Two clasp seats 2 may then be fitted onto opposite surfaces of the compact disc holding plate, with the posts 7 and insert holes 8 of one clasp seat 2 matching the corresponding insert holes 8 and receiving posts 7 of the other of the clasp seats 2 via the positioning through holes 3. Referring to the grip slots 4, they are disposed oppositely in the carrier 1. They may be configured to have any shape although they are shown as curved slots in the drawings. These grip slots 4 provide spaces for the fingers of the user when placing or removing the compact disc thereon or therefrom when the user holds the compact disc by its circumferential edge with his/her fingers.

Although the present invention has been illustrated and described with reference to the preferred embodiment thereof, it should be understood that it is in no way limited to the details of such embodiment but is capable of numerous modifications within the scope of the appended claims.

What is claimed is:

1. A compact disc holder assembly comprising:
   a) a planar-shaped carrier having a positioning through hole formed therein;
   b) a pair of clasp seats, each seat including a plurality of spaced posts and a plurality of spaced insert holes, and at least one seat being provided with an elastic pawl means for securing a compact disc; and c) the clasp seats being disposable on opposite sides of the positioning through hole to permit the posts of each seat to engage within the insert holes of the other seat and define a plurality of joints for securing the seats and the carrier together.

2. The assembly of claim 1 wherein each of the clasp seats is provided with an elastic pawl means for securing a compact disc.

3. The assembly of claim 1 wherein the carrier further includes a pair of oppositely disposed slots for gripping by a user during removal of discs from or placement of discs on the assembly.

4. The assembly of claim 1 wherein the joints are reinforced by welding.

5. The assembly of claim 1 wherein the joints are reinforced by an adhesive agent.

6. The assembly of claim 1 wherein:

a) each clasped seat includes an outer surface and an inner surface, with the pawl means extending outwardly from the outer surface of the one seat; and b) the posts extending outwardly from the inner surface of each seat.

* * * * *